R. L. MEALUS.
HAY LOADER.
APPLICATION FILED NOV. 1, 1907.

911,665.

Patented Feb. 9, 1909.
2 SHEETS—SHEET 1.

WITNESSES
Chas. A. Xardell
Sarah E. Clark

INVENTOR
ROY L. MEALUS
BY Robinson, Martin Jones
ATTORNEYS

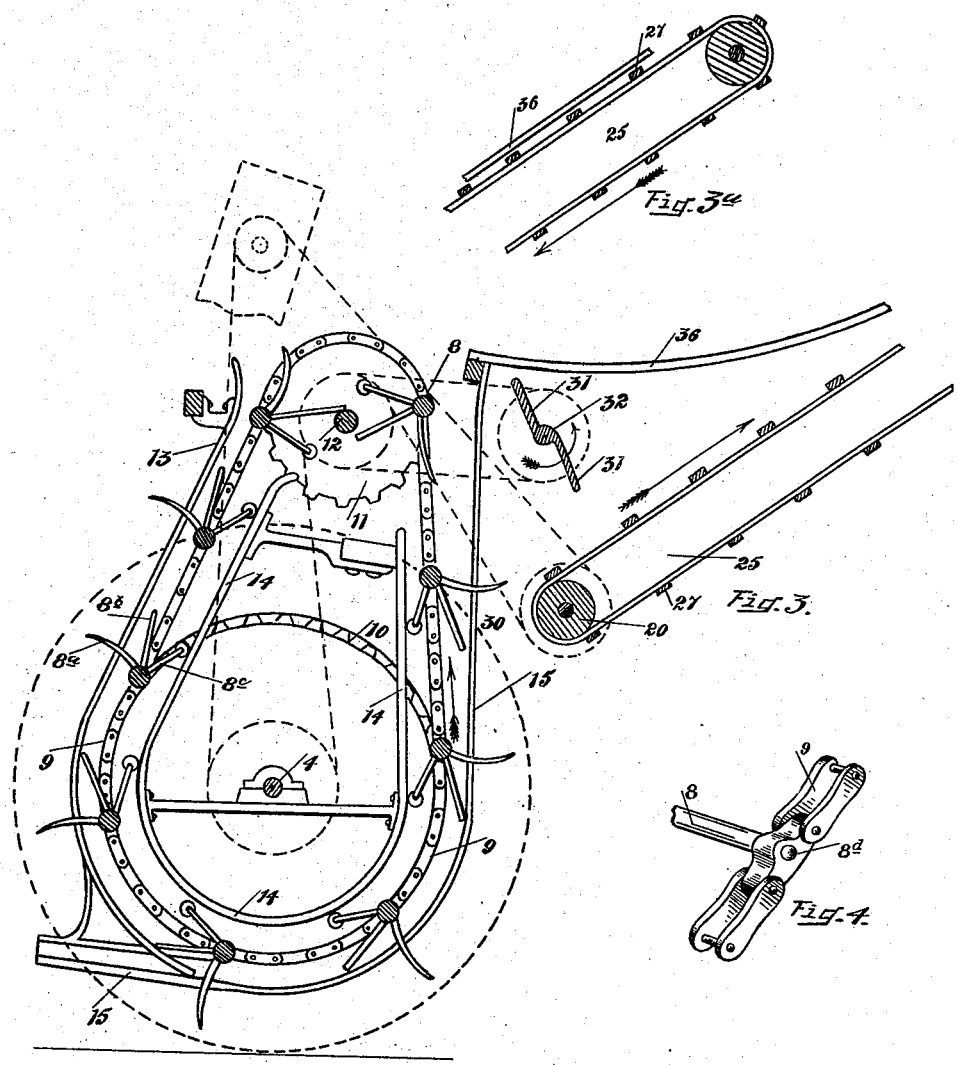

UNITED STATES PATENT OFFICE.

ROY L. MEALUS, OF BARNEVELD, NEW YORK, ASSIGNOR OF ONE-HALF TO GLENN P. DODGE, OF UTICA, NEW YORK.

HAY-LOADER.

No. 911,665.     Specification of Letters Patent.     Patented Feb. 9, 1909.

Application filed November 1, 1907. Serial No. 400,161.

*To all whom it may concern:*

Be it known that I, ROY L. MEALUS, of Barneveld, in the county of Oneida and State of New York, have invented certain new and useful Improvements in Hay-Loaders; and I do hereby declare that the following is a full, clear, and exact description thereof, which will enable others skilled in the art to which it appertains to make and use the same, reference being had to the accompanying drawings, and to the letters of reference marked thereon, which form part of this specification.

The object of my invention is to provide an improved hay-loader which is adapted to gather the hay in a complete and efficient manner and deliver it on to a wagon, and is adapted to adapt itself to unevenness of the ground without injuring the mechanism or clogging the action of the machine.

Figure 1:
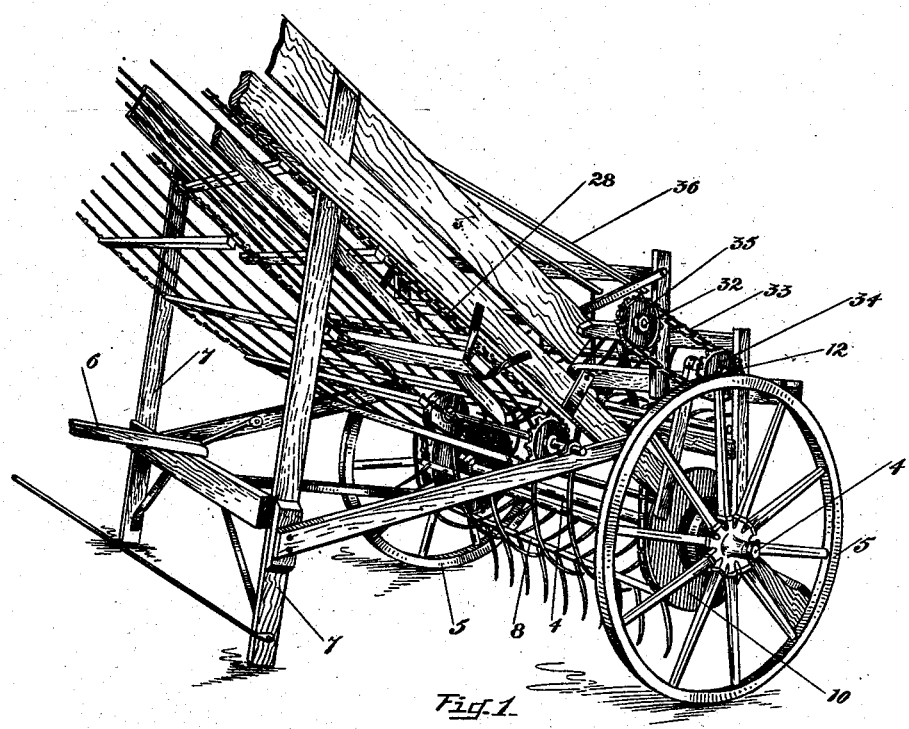
Figure 2:
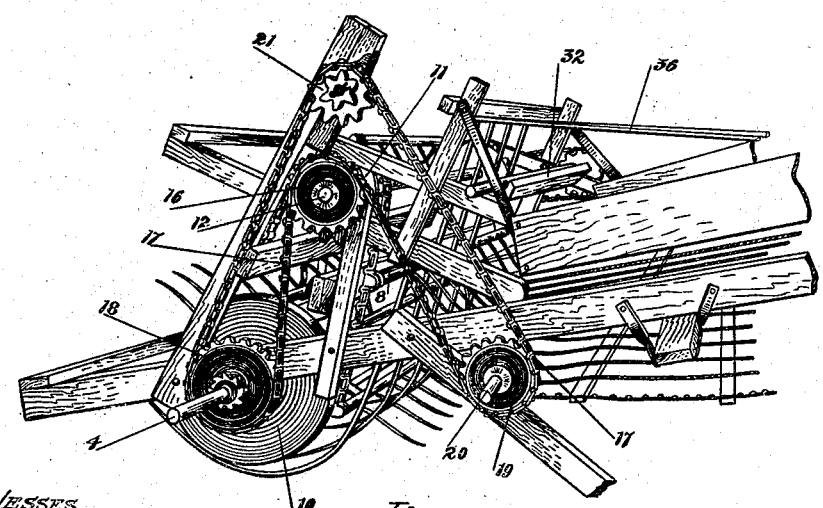

Figure 1 shows a perspective view of a machine embodying the device of my construction. Fig. 2 shows a perspective view of parts of the machine on an enlarged scale. Fig. 3 is a detail sectional view showing the more important parts of the mechanism. Fig. 3$^a$ is a supplemental view to Fig. 3 showing the upper end of the carrier. Fig. 4 shows a detail of the machine in perspective.

The machine consists of a frame mounted at its rear end on an axle 4 and carrying wheels 5, 5 and at its forward end provided with a short tongue or pole 6, by means of which the machine may be attached to the rear of a wagon, and also with legs 7 which are adapted to support the forward end of the machine when not attached to a wagon, and which legs are elevated from the ground a sufficient distance to not interfere with the travel of the machine when the same is attached to the wagon. The machine consists of two main mechanisms, namely: the elevator and the carrier. The elevator consists of a series of tine bars 8 mounted on a pair of sprocket chains 9, which chains 9 pass around wheels 10 and sprocket wheels 11 provided adjacent to the opposite sides of the machine, the wheel 10 being mounted on and, of course, concentric with the main shaft 4. These wheels 10 are arranged to run free or independent of the shaft 4 while the sprocket wheels 11 are secured to the shaft 12 mounted in bearings for rotation in the upper portion of the frame. The tine bars 8, which extend substantially the full width of the machine, are provided with tines 8$^a$ arranged in suitable numbers along the bar and with a bar controlling device consisting of the two arms 8$^b$ and 8$^c$ arranged with reference to each other in a V-shaped form and adapted to engage with outer track 13 and inner track 14. These tracks 13 and 14 are arranged in the frame preferably substantially in the middle of the machine, and one pair of tracks together with one set of arms 8$^b$ and 8$^c$ are sufficient for each tine bar. The tine bars are provided at their respective ends with pivots or gudgeons 8$^d$, which engage in suitable links in the sprocket chain 9. Passing around the forward side of the elevator consisting of the tine bars, the sprocket chain 9 and the operating mechanism are a number of stripping bars 15 secured at their respective ends to suitably arranged frame bars of the machine and between which the projecting ends of the tines are adapted to extend when in active or operating position.

For driving the elevator there is provided on one end of the shaft 12 carrying the sprocket wheels 11, a sprocket wheel 16 which engages with a sprocket chain 17 passing around a sprocket wheel 18 on the main axle or shaft 4, which main axle or shaft 4 is driven by the carrying wheels 5 as the machine is drawn forwardly. The sprocket chain 17 aside from passing around the sprocket wheel 16 also passes around a sprocket wheel 19 provided on the shaft 20 at the lower end of the carrier and passes around an idle sprocket wheel 21, which may be arranged as a tightener. The carrier 25, consisting preferably of a belt of cords, as 26, slats 27 and border sprocket chains 28 all passing around wheels or rollers on the shaft 20 at the lower end and around suitable wheels or rollers 20$^a$ at the upper end of the carrier and is arranged at an angle of preferably about 45 degrees or somewhat steeper in the frame of the machine. The carrier is arranged at a point considerably above the ground and nearly at the top of the effective portion of the elevator. It is also arranged at its lower end far enough distant from the elevator to allow the tines when projecting substantially in the lateral position to pass freely through the opening 30 between the lower end of the carrier and the elevator when loaded with hay.

To assist the transfer of the hay from the elevator to the carrier, beaters 31 may be provided on a rotary shaft 32 provided in the frame. These beaters are driven by a sprocket chain 33 passing around sprocket wheels 34 and 35 secured on the ends of the shafts 12 and 32, respectively, on the opposite side of the machine from the sprocket chain 17. To hold the hay down on the carrier a set of longitudinal floating slats 36 are provided secured to the frame at their lower ends.

It will be noted that the gearing is such that as the machine is drawn forward the elevator will run in the opposite direction from that in which the carrying wheels 5 run causing the tines to rake the ground in a forwardly direction. In order to bring the tines into practically radial position as they pass around the circle at the lower end of the elevator, the arm 8$^c$ engages with and runs on the inner track 14 affording a support against rotation of the tine bar in its bearings in the sprocket chains whereby the tines have sufficient resistance to gather the hay as the machine advances. The support from the inner track 14 is continued up the front side of the elevator until the tine bar passes above the level of the lower end of the carrier. At this point the track 14 terminates, which frees the tine bar enabling it to drop its load and withdraw the tines from their projecting position between the stripping bars 15. The arrangement is such that as the tine bars are passing around the sprocket wheel 11 at the upper end of the elevator the shaft 12 will be received in the V-shaped opening between the arms 8$^b$ and 8$^c$ of the tine bar, which as the tine bar passes around the wheel will serve to reverse the tine bar and cause the two arms 8$^b$ and 8$^c$ to enter between the two tracks 13 and 14 in such manner as to bring the tines into proper operative position as they pass around the lower end of the carrier. In order to reduce the friction between the tine bar arm 8$^c$ and the track 14, the arms 8$^c$ will preferably be provided with rollers in their ends as shown.

The advantage of having the lower end of the elevator concentric with the axle of the carrying wheels is that in passing over rolling ground the point of active engagement between the ends of the tines and the ground is on the line between the points of contact of the carrying wheels with the ground whereby they are regulated to the ground to the best possible advantage to both gather the hay therefrom and be saved from injury by reason of stones or projections on the ground. It is also true that the tines are saved from digging into the ground by this arrangement as far as possible, which is desirable for the reason that when the tines dig in the ground they are liable to stop the operation of the machine or require an excessive amount of power to operate it. In making the lower elevator wheels concentric with the axis of the carrying wheels, the end of the tines describe a segment of a circle of large radius and rake the ground to good advantage.

The drive by means of a sprocket chain as shown is considered particularly effective in securing the desired motions at the desired speeds with a minimum friction and at a minimum cost of manufacture.

What I claim as new and desire to secure by Letters Patent is:

1. The combination in a hay loader of a frame, a pair of wheels carrying the frame, lower elevator wheels concentric with the carrying wheels, upper elevator wheels, a belt elevator passing around the said upper and lower wheels and having tines, means for supporting the tines in projecting position with reference to the elevator during a portion of the circuit, means for driving the elevator in the opposite direction from the carrying wheels, and an inclined carrier supported in the frame with its lower end in close proximity to the upper end of the elevator, substantially as set forth.

2. The combination in a hay loader of a frame, a pair of carrying and driving wheels, lower and upper elevator wheels, an elevator, consisting of a pair of chains and tine bars pivotally mounted in said chains, mounted and running on said elevator wheels, the lower elevator wheels being arranged concentric with the carrying wheels, arms projecting in substantially V-shape from each tine bar, a pair of substantially parallel tracks following the course of the elevator throughout a portion of its travel with which said tine bar arms are adapted to engage, strippers mounted on the frame and passing up the forward side of the elevator, and means for driving the elevator from the carrying wheels in the reverse direction, substantially as set forth.

3. The combination in a hay loader of a frame and carrying wheels, lower and upper elevator wheels, the lower wheels being arranged concentric with the carrying wheels, a belt elevator mounted on said elevator wheels and having rocking tine bars pivotally mounted therein, a carrier mounted in the frame having its lower end arranged adjacent to the upper end and front side of the elevator, and a rotary beater arranged above and adjacent to the lower end of the carrier and the upper end of the elevator, substantially as set forth.

4. The combination in a hay loader of a frame, a pair of carrying and driving wheels, an axle shaft on which the frame is mounted on the wheels, lower elevator wheels mounted on the axle shaft concentric with the carrying wheels, an upper elevator shaft and elevator wheels mounted thereon, an elevator consisting of chains and rocking tine bars passing around said elevator wheels, said rocking tine bars having V-shape projecting arms, a track following the course of the elevator, means for driving the elevator in the opposite direction from that of the rotation of the carrying wheels, and a carrier arranged on an incline in the frame with its lower end adjacent to the upper front side of the elevator, substantially as set forth.

In witness whereof, I have affixed my signature, in presence of two witnesses, this 15th day of Oct. 1907.

ROY L. MEALUS.

Witnesses:
 LLOYD BUNNING,
 F. L. WORDEN.